(12) United States Patent
Miyamoto et al.

(10) Patent No.: US 7,312,540 B2
(45) Date of Patent: Dec. 25, 2007

(54) LINEAR MOTOR ARMATURE AND LINEAR MOTOR

(75) Inventors: Yasuhiro Miyamoto, Fukuoka (JP); Takeshi Inoue, Fukuoka (JP)

(73) Assignee: Kabushiki Kaisha Yasakawa Denki, Fukuoka (JP)

( * ) Notice: Subject to any disclaimer, the term of this patent is extended or adjusted under 35 U.S.C. 154(b) by 188 days.

(21) Appl. No.: 10/501,787

(22) PCT Filed: Jan. 17, 2003

(86) PCT No.: PCT/JP03/00366

§ 371 (c)(1), (2), (4) Date: Jul. 19, 2004

(87) PCT Pub. No.: WO03/063325

PCT Pub. Date: Jul. 31, 2003

(65) Prior Publication Data

US 2005/0140213 A1    Jun. 30, 2005

(30) Foreign Application Priority Data

Jan. 18, 2002    (JP)    ............................. 2002-009681

(51) Int. Cl.
*H02K 41/02*    (2006.01)
(52) U.S. Cl. ....................................................... 310/12
(58) Field of Classification Search ................. 310/12, 310/13
See application file for complete search history.

(56) References Cited

U.S. PATENT DOCUMENTS

| | | | | |
|---|---|---|---|---|
| 1,241,333 | A | * | 9/1917 | Bowman ........................ 124/3 |
| 4,439,698 | A | * | 3/1984 | Chen ............................ 310/12 |
| 5,075,583 | A | * | 12/1991 | Sakagami et al. ............. 310/12 |
| 5,831,353 | A | * | 11/1998 | Bolding et al. ................ 310/12 |
| 2001/0048249 | A1 | * | 12/2001 | Tsuboi et al. .................. 310/12 |
| 2002/0047323 | A1 | * | 4/2002 | Kawada ......................... 310/13 |

FOREIGN PATENT DOCUMENTS

| | | | |
|---|---|---|---|
| JP | 3-135357 | * | 6/1991 |
| JP | 7-46895 B2 | | 5/1995 |

(Continued)

*Primary Examiner*—Burton Mullins
(74) *Attorney, Agent, or Firm*—Sughrue Mion Pllc.

(57) ABSTRACT

Connectors (25a), (25b), (25c), (25d), (25e), and (25f) for electrically connecting lead wires of armature windings (4) coiled around armature blocks (10), (11), and (12) are provided at respective ends of a plurality of the armature blocks (10), (11), and (12) such that connections of the armature windings (4) in the respective armature blocks become parallel connections. The connector pair including the connectors (25b), (25c) and the connector pair including the connectors (25d), (25e), which are provided between the armature blocks, are embodied as in-phase connections. On condition that the number of phases of the armature winding is taken as three and a magnetic pole pitch of a magnetic field is taken as τp, the armature blocks are spaced apart from each other at intervals of ⅔ τp. As a result, there can be obtained an armature of a linear motor and a linear motor, which can facilitate processing of lead wires of the armature windings and make the operation for assembling the armature blocks efficient and which enable an attempt to increase the thrust of the motor in accordance with an increase in the stroke of the movable element.

6 Claims, 6 Drawing Sheets

FOREIGN PATENT DOCUMENTS

| | | |
|---|---|---|
| JP | 2000-197337 A | 7/2000 |
| JP | 2000-278929 A | 10/2000 |
| JP | 2000-278931 A | 10/2000 |
| JP | 2001-275336 A | 10/2001 |
| JP | 2001-352609 A | 12/2001 |
| JP | 2001-352744 A | 12/2001 |

* cited by examiner

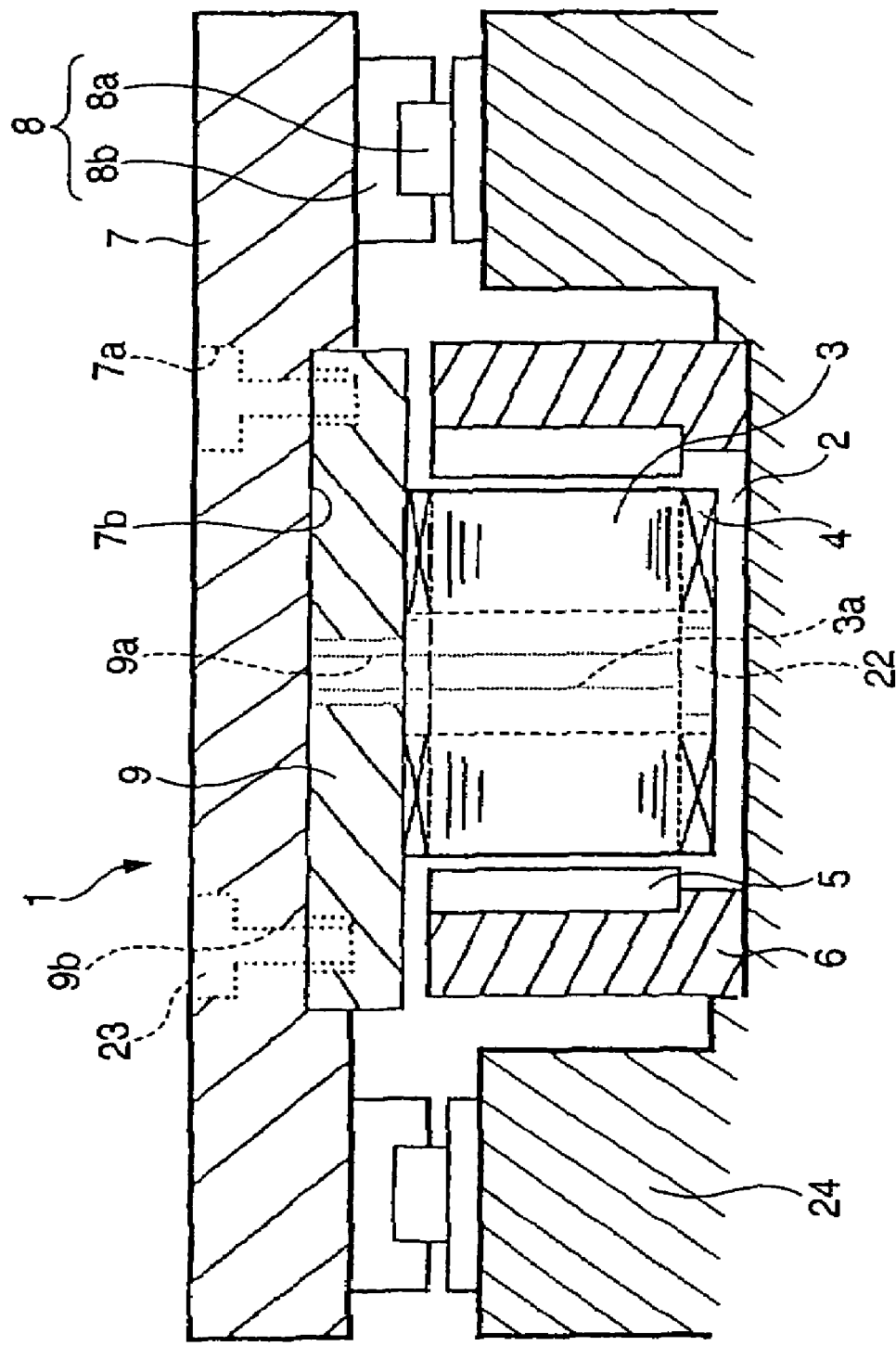

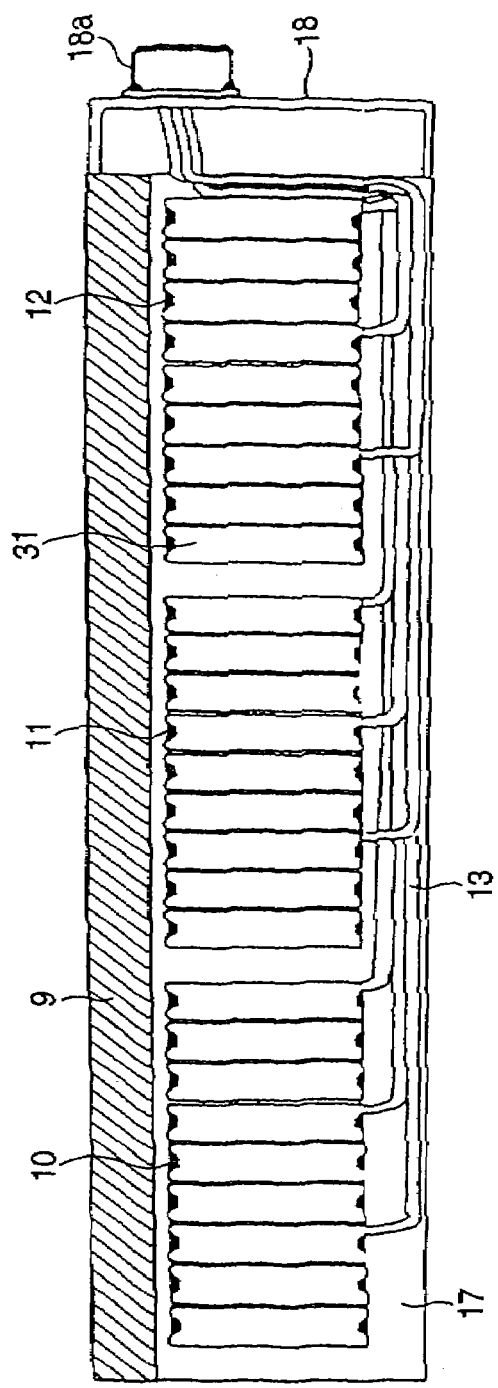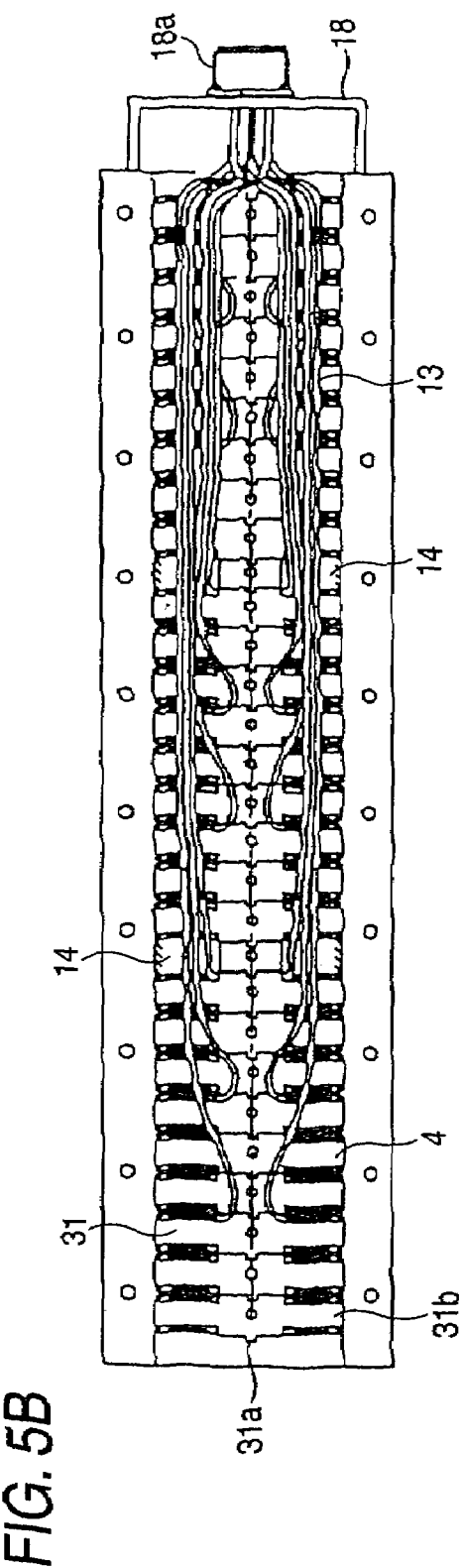
FIG. 5A PRIOR ART
FIG. 5B PRIOR ART

LINEAR MOTOR ARMATURE AND LINEAR MOTOR

TECHNICAL FIELD

The present invention relates to an armature of a linear motor and to a linear motor, which enable an attempt to increase thrust when the length of an armature is increased in accordance with an increase in the stroke of a movable member and realize cost reduction and improved efficiency at the time of assembly of an armature block.

BACKGROUND ART

Conventionally, a linear motor utilized for a machine tool or precision feeding of a semiconductor manufacturing system or the like has a structure such as that shown in FIG. 4.

FIG. 4 is a front cross-sectional view showing the entire configuration of a common linear motor, which will be described by means of taking as an example a linear motor having a through-flux-type structure. Reference numeral 1 designates a linear motor; 2 designates an armature which permits penetration of a magnetic flux; 3 designates an armature core formed by stacking flat rolled magnetic steel sheets and strips one on top of the other; 4 designates an armature winding coiled around the armature core 3; and 5 designates smoothing magnetic field magnets which are disposed on both longitudinal sides of the armature core 3 so as to oppose each other at right angles by way of a gap and which are formed from permanent magnets. Reference numeral 6 designates smoothing yokes which have the magnets 5 affixed thereon and permit penetration of a magnetic field; 7 designates a table disposed on an upper surface of the armature 2; 8 designates linear guides; 8a designates guide rails; 8b designates sliders; 9 designates an armature mount plate; 9a designates female screw sections; 22, 23 designate fastening bolts; and 24 designates a fixed bed.

In such a linear motor 1, the magnetic-field-side smoothing yokes 6 are fixed on the fixed bed 24, and the armatures 2 are fastened by means of screwing the fastening bolts 22 into the female screw sections 9a of the armature mount plate 9 by way of through holes 3a of the armature core 3. The table 7 is fastened by means of screwing the fastening bolts 23 into female screw sections 9b formed in the armature mount plate 9, by way of through holes 7a. The linear motor 1 is further supported by the linear guides 8 which are each formed from the guide rail 8a and the slider 8b. The armature 2 carrying the table 7 generates thrust in the direction of a line of the permanent magnets 5, thereby enabling smooth linear movement.

Particularly, in relation to the structure of the armature which is required to increase the stroke of the movable member according to an application, an armature shown in FIGS. 5 and 6 is put forward as the armature of such a linear motor (described in, e.g., JP-A-2000-278929).

FIG. 5 shows the armature of the linear motor showing a first background-art technique, wherein FIG. 5A is a side cross-sectional view of the armature, and FIG. 5B is a plan view of the armature when viewed from the bottom thereof. The drawings show an example wherein the number of armature blocks is three and the number of teeth per armature block is nine.

The armature core 3 includes a first armature block 10, a second armature block 11, and a third armature block 12, and spacers 14 are provided between the armature blocks, thereby maintaining gaps. The armature blocks 10 to 12 and the spacers 14 are arranged in the direction of thrust of the linear motor and fixed by the armature mount plate 9. Each of block cores 31 constituting the respective armature blocks 10 to 12 has teeth sections 31a arranged at equal pitches and are sequentially coupled together by way of engagement sections 31b.

During coil wire processing of the armature 2, an armature winding 4 formed from an U-phase coil, a V-phase coil, and a W-phase coil is housed in each of the teeth 31a of the respective armature blocks 10 to 12 such that a lead wire 13 of each armature winding 4 is led from the bottom of the armature block 31 to the direction of thrust of the linear motor. Moreover, the surroundings of the armature block and the bottom of the same where the lead wire 13 is provided are fixed with resin mold 17. Reference numeral 18 designates a terminal box; and 18a designates a connector terminal. The lead wires 13 of the respective armature windings are bundled into the terminal box 18 and connected to the connector terminal 18a.

The coil wire processing of the other coils of the armature 2 is performed as shown in FIG. 6. FIG. 6 shows an armature of a linear motor showing a second background-art technique, wherein FIG. 6A is a side cross-sectional view of the armature, and FIG. 6B is a plan view of the armature when viewed from the bottom. The drawings show an example wherein the number of armature blocks is three and the number of teeth per armature block is nine.

In FIG. 6, reference numeral 15 designates a first lead wire through passage; and 20 designates a second lead wire through passage. Formed in each of the spacers 14 provided between the armature blocks 10 to 12 is the first lead wire through passage 15 having a bore section oriented in the longitudinal direction (i.e., the direction at right angles to the armature mount plate 9) of the spacer. The second lead wire through passage 20 is formed so as to communicate with the first lead wire through passage 15 in the longitudinal direction of the armature mount plate 9. A trench having a depth which enables accommodation of the lead wire 13 is formed in the second lead wire through passage 20 from the surface of the armature mount plate 9 toward the inside thereof.

However, the background-art techniques have the following problems.

(1) During the lead wire processing of the armature winging 4 shown in FIG. 4, the lead wire 13 of each armature winding 4 is led from the bottom sections of the armature blocks 10 to 12 to the direction of thrust of the linear motor, and the lead wires are collectively extracted to the terminal box. Since the number of block cores 31 and the number of armature blocks are increased, the lead wires 13 of respective phase coils in the bottom sections of the armature blocks become larger in number and bulky, which is responsible for deterioration of the efficiency of operation for assembling the armature block.

(2) During the lead wire processing of the armature coil 4 shown in FIG. 5, the volume of lead wires is reduced by effective utilization of the spacers 14. However, the lead wires are mounted, in a spreading manner, at a plurality of locations, such as the spacers, the armature mount plates, and the bottom sections of the armature blocks. Hence, this configuration also encounters difficulty in rendering efficient the operation for assembling the armature block.

(3) Moreover, when the related-art techniques are applied to a case where the present invention is applied to a plurality of feed rods, as an example to which the linear motor is applied, the respective feed rods require a plurality of linear motors having different thrust specifications. The respective motors require armatures of different shapes and dimensions. Therefore, this case is disadvantageous in terms of (1) an increase in costs incurred in development and investment of the linear motors used in one machine tool and (2) a necessity for replacing the entire armature block including armatures with a new armature block when imperfections have arisen in a part of the armature block.

The present invention is conceived to solve the foregoing problems and is aimed at providing an armature of a linear motor and a linear motor, which facilitate lead wire processing of armature windings, render efficient an operation for assembling an armature block, and enable an attempt to increase the thrust of a motor in accordance with an increase in the stroke of a movable member.

DISCLOSURE OF THE INVENTION

To solve the problem, the present invention provides an armature of a linear motor having a modular-type armature which is divided into a plurality of armature blocks and around which an armature winding is coiled, a plurality of the armature blocks being formed by sequentially coupling a plurality of block cores, and connectors to be used for electrically connecting lead wires of armature windings coiled around the armature blocks are provided on both ends of a plurality of the armature blocks such that connections of the respective armature blocks and connections of the armature windings become serial or parallel, wherein the connectors provided between the armature blocks are in the form of in-phase connections.

Specifically when the number of the armature windings is three and a magnetic pole pitch of a magnetic field is taken as τp, the armature blocks are separated from each other at intervals corresponding to an electrical angle of an integral multiple determined by dividing the magnetic pole pitch by the number of sub-divisions of the armature blocks.

More specifically the armature blocks are separated from each other at intervals of ⅔ the magnetic pole pitch.

More specifically the armature blocks are separated from each other at intervals of ⅘ the magnetic pole pitch.

In a specific enhancement the armature has an armature mount plate which is arranged in the direction of thrust of the linear motor and provides a retaining function provided on each of the armature blocks, an engagement projection provided at one end of each armature mount plate, wherein an engagement groove is formed in the other end of the same to couple together the armature blocks.

In yet an other specific enhancement, the armature has a magnetic field disposed so as to oppose the armature by way of a gap, wherein the magnetic field is generated by a yoke, and a plurality of permanent magnets disposed on the yoke such that different polarities are arranged alternately, and either the armature or the magnetic field is taken as a movable element which moves, and the other is taken as a stator.

BRIEF DESCRIPTION OF THE DRAWINGS

FIG. 3 shows a linear motor shows a third embodiment of the present invention, wherein

FIG. 4 is a front cross-sectional view showing the entire configuration of a common linear motor.

FIG. 5 shows an armature of a linear motor of a first related-art technique, wherein FIG. 5A is a side cross-sectional view of the armature, and FIG. 5B is a plan view of the armature when viewed from the bottom.

FIG. 6 shows an armature of a linear motor of a second related-art technique, wherein

Figure 1:
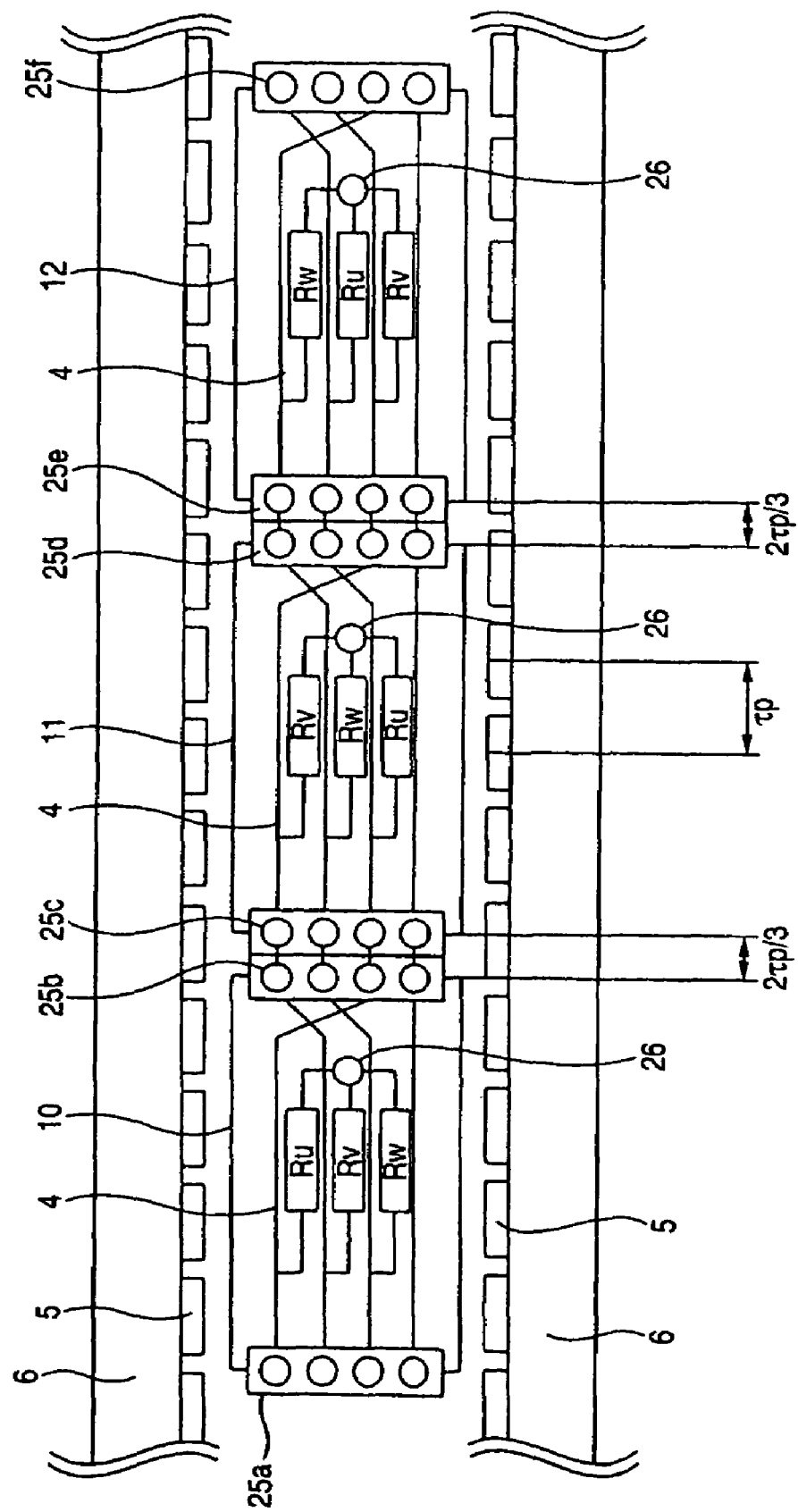
FIG. 1 is a plan view of linear motor which shows a first embodiment of the invention and describes connection of an armature block and connection of armature windings.

Reference numerals shown in FIG. 1 designate the following elements: namely, reference numeral 4 designates an armature winding; 5 designates a permanent magnet; 6 designates a yoke; 10 designates a first armature block; 11 designates a second armature block; 12 designates a third armature block; 25a, 25b, 25c, 25d, 25e, and 25f designate connectors; and 26 designates a neutral point.

BEST MODES FOR IMPLEMENTING THE INVENTION

The present invention will be described hereinbelow on the basis of illustrated embodiments.

FIRST EMBODIMENT

FIG. 1 is a plan view of linear motor which shows a first embodiment of the invention and describes connection of an armature block and connection of armature windings. The linear motor is identical with the related-art linear motor in that the linear motor has modular-type armatures which are divided into a plurality of armature blocks around which armature windings are wound; and in that each of the armature blocks is formed by sequentially connecting a plurality of the block cores. Those constituent elements which are the same as those of the related-art linear motor are assigned the same reference numerals, and their repeated explanations are omitted. Explanations are given of only the differences.

In the drawings, reference numerals 25a, 25b, 25c, 25d, 25e, and 25f designate connectors, and reference numeral 26 designates a neutral point.

The present invention differs from the related art in the following points:

Namely, the connectors 25a, 25b, 25c, 25d, 25e, and 25f for electrically connecting lead wires of the armature windings 4 coiled around the armature blocks 10, 11, and 12 are provided at respective ends of a plurality of the armature blocks 10, 11, and 12 such that connections of the armature windings 4 in the respective armature blocks become parallel connections. The connector pair including the connectors 25b, 25c and the connector pair including the connectors 25d, 25e, which are provided between the armature blocks, are embodied as in-phase connections.

Specifically, in FIG. 1, on condition that the number of phases of the armature winding is taken as three and that a magnetic pole pitch of a magnetic field is taken as τp, the armature blocks 10, 11, and 12 are spaced apart from each other at intervals corresponding to electrical angles which are integral multiples determined by dividing the magnetic pole pitch τp by the number of sub-divisions of the armature blocks. Specifically, the embodiment shown in FIG. 1 is a case where the armature blocks 10, 11, and 12 are separated from each other at intervals corresponding to ⅔ τp the magnetic pole pitch (corresponding to an electrical angle of 120°) when the number of module armature blocks is three and the magnetic pole pitch corresponds to an electrical angle of 180°.

In more detail, in the armature block 10, when a terminal of the IN-side connector 25a has phases in sequence of a U phase (Ru), a V phase (Rv), and a W phase (Rw), a terminal of the OUT-side connector 25b has phases in sequence of a V phase (Rv), a W phase (Rw), and a U phase (Ru). As a result of the armature block 11 being coupled to the armature block 10, the terminal of the IN-side connector 25c has phases in the sequence of the V phase (Rv), the W phase (Rw), and the U phase (Ru); and the terminal of the OUT-side connector 25d has phases in the sequence of the W phase (Rw), the U phase (Ru), and the V phase (Rv). Moreover, as a result of the armature block 12 being coupled to the armature block 11, the terminal of the IN-side connector 25e has phases in the sequence of the W phase (Rw), the U phase (Ru), and the V phase (Rv), and the terminal of the OUT-side connector 25f has phases in the sequence of the U phase (Ru), the V phase (Rv), and the W phase (Rw). Thus, the three-phase armature windings are coupled together through Y connection.

The first embodiment is embodied by a configuration wherein the connectors 25a to 25f for electrically connecting the lead wires of the armature windings 4 coiled around the armature blocks 10, 11, and 12 are provided on respective ends of the plurality of the armature blocks 10, 11, and 12 such that the connections of the armature windings 4 of the respective armature blocks are connected in parallel to each other and such that the connection between the connectors 25b and 25c and the connection between the connectors 25d and 25e, all connectors being provided between the armature blocks, are realized in the form of in-phase connections, or a configuration wherein the armature blocks are separated from each other at intervals (⅔ τp) corresponding to the electrical angle which is an integral multiple of the value determined by dividing the magnetic pole pitch by the number of sub-divisions of the armature blocks. Thrust of the motor is increased to an integral multiple of the connected armature, and an interlinkage magnetic flux is also increased to an integral multiple. Thus, an attempt can be made to increase the thrust when the length of the armature is increased in accordance with an increase in the stroke of the movable member.

Processing of the lead wires of the armature winding 4 are connected together through use of the connectors 25a to 25f without taking the lead wires out of a lower surface of the armature block as is practiced conventionally or taking the lead wires out of the armature mount plate by way of the spacer. Hence, the lead wires do not become bulky on the lower end surface of the armature block. Moreover, molded portions of the lead wires can be eliminated by means of resin molding. Therefore, cost reduction and a higher efficiency can be realized at the time of assembly of the armature block.

The armatures of the linear motor of one type are formed from modular-type armatures having the same shape and dimensions. For instance, the armature is advantageous in that (1) the costs incurred in development of a linear motor to be used in one machine tool can be diminished, and in that (2) even when a failure has arisen in a part of the armature block, a necessity for discarding the entire armature or replacing the armature with a new armature is eliminated, and hence the costs incurred in performing maintenance of the linear motor can be diminished by requiring only replacement of a part of the block.

SECOND EMBODIMENT

A second embodiment of the present invention will now be described.

Figure 2:
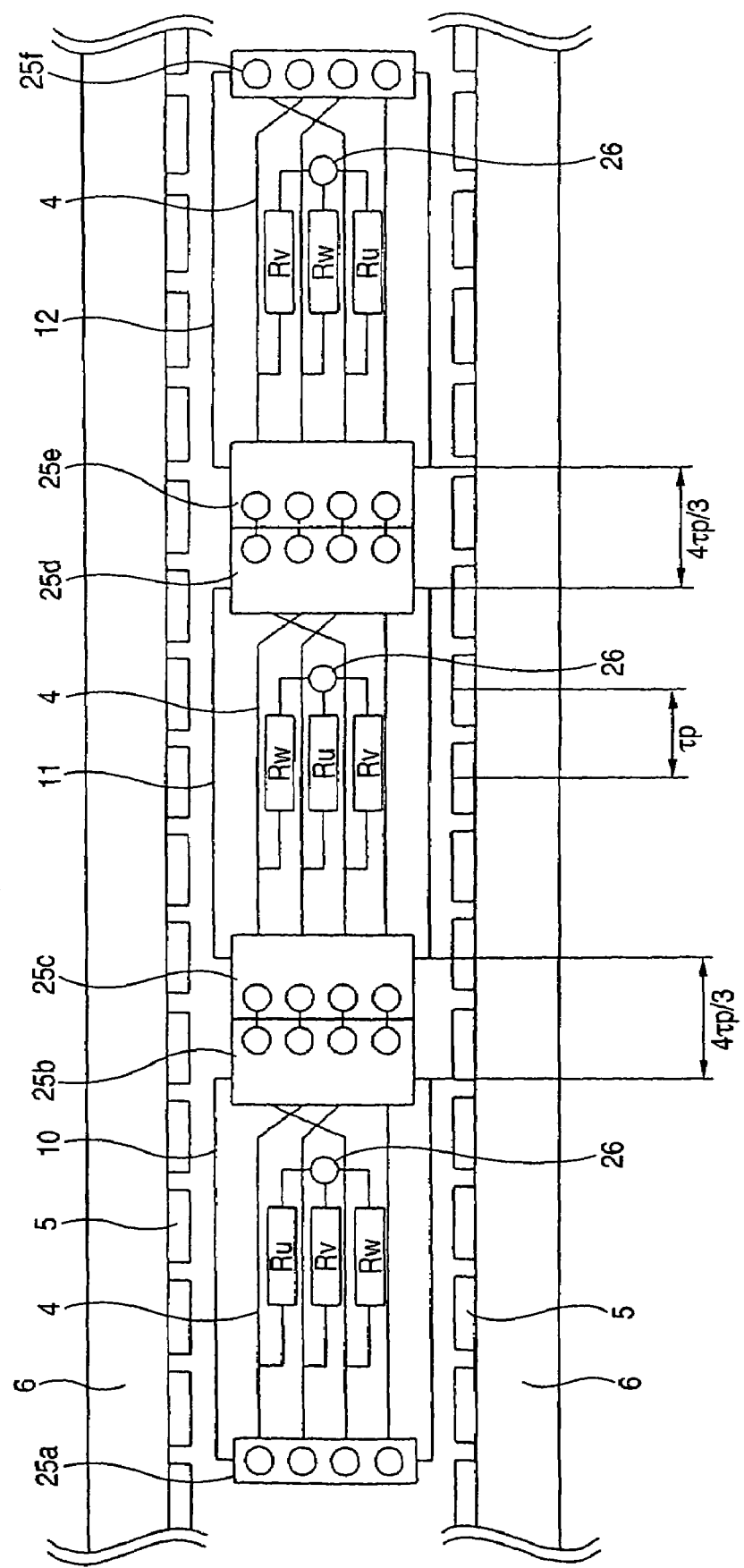
FIG. 2 is a plan view of a linear motor which shows a second embodiment of the invention and describes connection of an armature block and connection of armature windings.

FIG. 2 is a plan view of linear motor which shows a second embodiment of the invention and describes connection of an armature block and connection of armature windings.

The second embodiment differs from the first embodiment in that the armature blocks 10, 11, and 12 are separated from each other at intervals of ⅔ τp the magnetic pole pitch when the magnetic pole pitch of the magnetic field is taken as τp (corresponding to an electrical angle of 180°).

In more detail, in the armature block 10, when the terminal of the IN-side connector 25a has phases in the sequence of the U phase (Ru), the V phase (Rv), and the W phase (Rw), the terminal of the OUT-side connector 25b has phases in the sequence of the W phase (Rw), the U phase (Ru), and the V phase (Rv). As a result of the armature block 11 being coupled to the armature block 10, the terminal of the IN-side connector 25c has phases in the sequence of the W phase (Rw), the U phase (Ru), and the V phase (Rv); and the terminal of the OUT-side connector 25d has phases in the sequence of the V phase (Rv), the W phase (Rw), and the U phase (Ru). Moreover, as a result of the armature block 12 being coupled to the armature block 11, the terminal of the IN-side connector 25e has the phases in the sequence of the V phase (Rv), the W phase (Rw), and the U phase (Ru), and the terminal of the OUT-side connector 25f has phases in the sequence of the U phase (Ru), the V phase (Rv), and the W phase (Rw). Thus, the three-phase armature windings are coupled together through Y connection.

Since the interval between the connectors 25b and 25c and the interval between the connectors 25d and 25e, all the connectors being provided between the respective armature blocks 10, 11, and 12, are set to ⅔ τp, the present embodiment yields the same advantage as that yielded by the first embodiment. The trust can be increased by means of increasing the stroke of the linear motor by means of selecting a combination of the number of magnetic poles of the permanent magnet and the number of armature blocks, as appropriate.

THIRD EMBODIMENT

A third embodiment of the present invention will now be described.

Figure 3A:
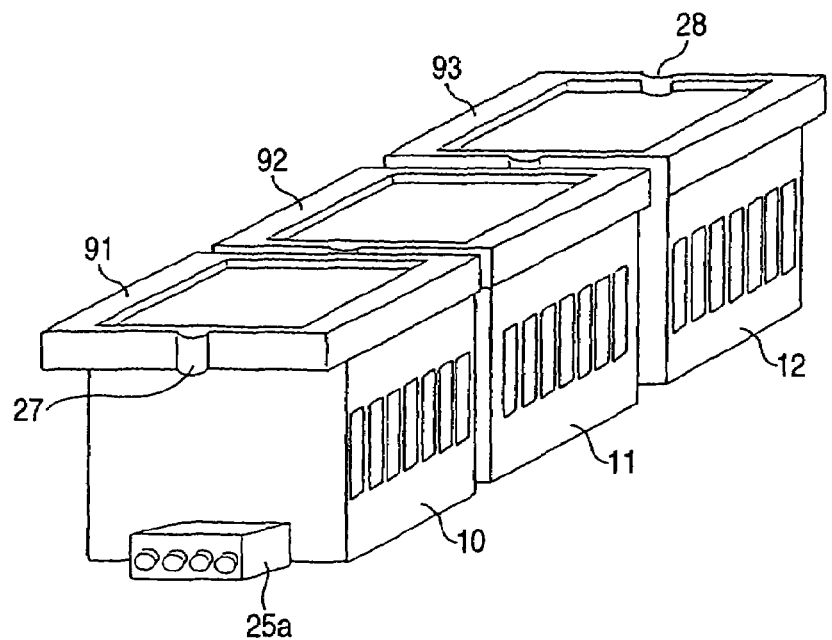
FIG. 3A is a perspective view of the entire armature.
Figure 3B:
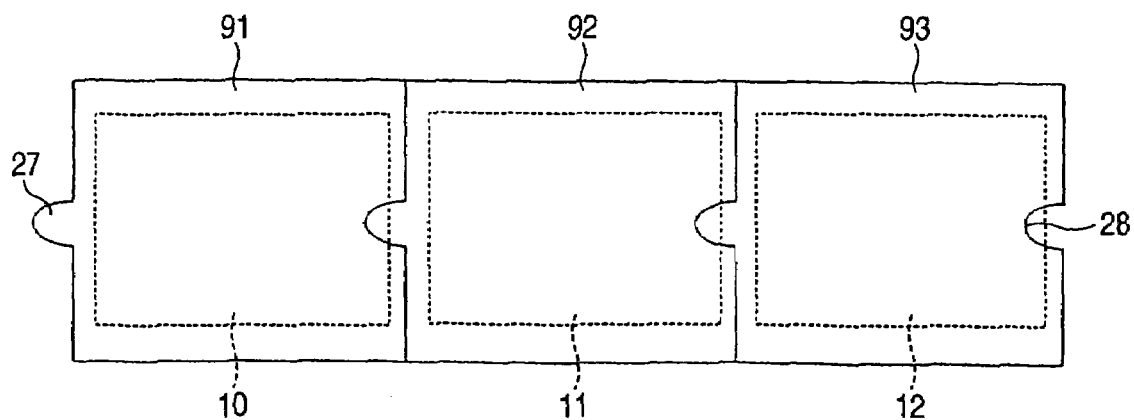
FIG. 3B is a plan view for describing connection of the armature blocks.
Figure 6A:
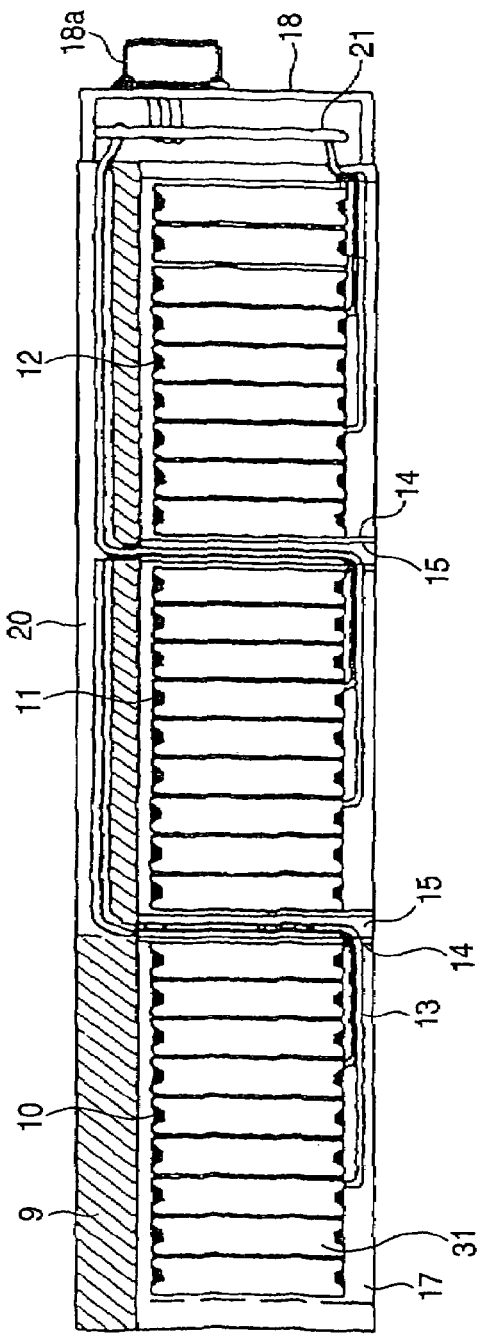
FIG. 6A is a side cross-sectional view of the armature.
Figure 6B:
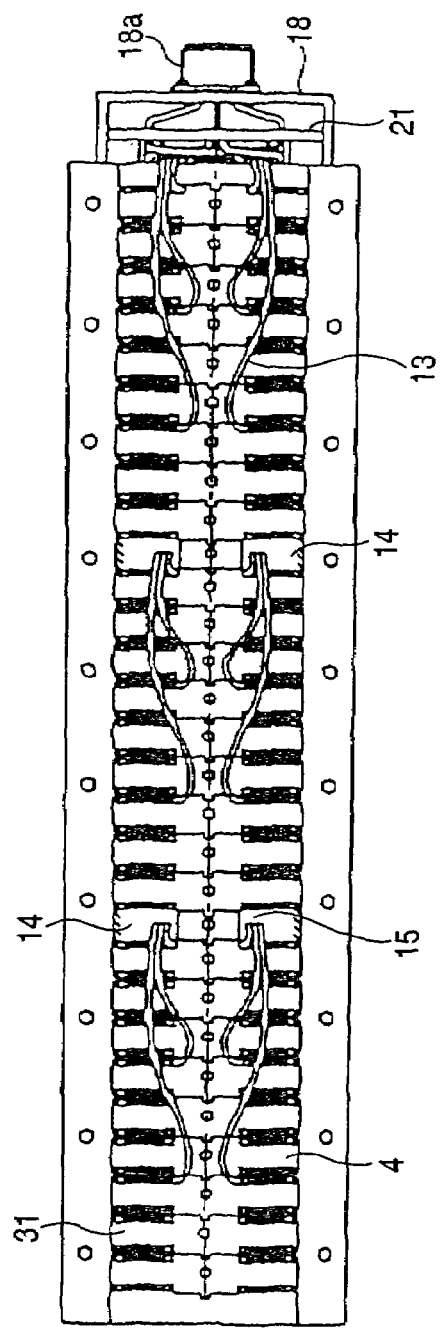
FIG. 6B is a plan view of the armature when viewed from the bottom.

FIG. 3 shows a linear motor of a third embodiment of the present invention, wherein FIG. 3A is a perspective view of the entire armature, and FIG. 3B is a plan view for describing connection of the armature blocks.

In FIG. 3, reference numeral 27 designates an engagement projection; 28 designates an engagement groove; and 91, 92, and 93 designate armature mount plates.

The third embodiment differs from the first and second embodiments in that the armature mount plates 91, 92, and 93 for retaining the armature blocks are provided in the respective armature blocks 10, 11, and 12 in the direction of thrust of the linear motor 1; in that the engagement projection 27 is provided at one end of each of the armature mount plates 91 to 93, and the engagement groove 28 is formed in the other end of each of the same; and in that the armature blocks are joined together.

In the third embodiment, the armature mount plates 91 to 93 provided for each of the armature blocks 10, 11, and 12 are coupled together by means of the engagement projections 27 and the engagement grooves 28. The present embodiment can contribute to an operation for assembling the armature blocks as well as an increase in the efficiency of assembly of the entire armature.

The present embodiment shows an example in which connectors to be used for electrically connecting the lead wires of the armature windings are provided on both ends of the armature blocks such that connections of the respective armature blocks and connections of the armature windings become parallel. However, a configuration in which the connections of the armature windings are made in series may also be adopted. In such a case, there is yielded the same advantage as that yielded in the case of the parallel connections.

The explanations are provided for the embodiment, wherein the engagement projection is provided at one end of the armature mount plate provided in each armature block, and the engagement groove is formed in the other end of the same, thereby coupling the armatures together. However, pin-shaped projections, and grooves to be engaged with the projections may be provided in place of the engagement projections and grooves.

INDUSTRIAL APPLICABILITY

As mentioned above, the linear motor of the present invention is utilized for, e.g., applications of precision feeding of a machine tool or a semiconductor manufacturing apparatus and is useful as an armature of a linear motor suitable for a longer stroke of the movable element and as a linear motor.

The invention claimed is:

1. An armature of a linear motor comprising:
   a modular-type armature which is divided into a plurality of armature blocks and around which an armature winding is coiled, a plurality of the armature blocks being formed by sequentially coupling a plurality of block cores, and
   connectors to be used for electrically connecting lead wires of armature windings coiled around the armature blocks provided on both ends of a plurality of the armature blocks so that connections of the respective armature blocks and connections of the armature windings become serial or parallel, wherein
   the connectors provided between the armature blocks are connected in a form of in-phase connections
   wherein if an in-side connector of one of said armature blocks has terminals in a sequence of phases u, v and w, an out-side connector of said one of said armature blocks has terminals in a sequence of phase of v, w, and u.

2. The armature of a linear motor according to claim 1, wherein
   when the number of the armature windings is three and a magnetic pole pitch of a magnetic field is taken as τp, the armature blocks are separated from each other at intervals corresponding to an electrical angle of an integral multiple determined by dividing the magnetic pole pitch by a number of sub-divisions of the armature blocks.

3. The armature of a linear motor according to claim 2, wherein
   the armature blocks are separated from each other at intervals of ⅔ the magnetic pole pitch.

4. The armature of a linear motor according to claim 2, wherein
   the armature blocks are separated from each other at intervals of ⁴⁄₃ the magnetic pole pitch.

5. The armature of a linear motor according to any one of claims 1 through 4, further comprising:
   an armature mount plate which is arranged in the direction of thrust of the linear motor and provides a retaining function provided on each of the armature blocks, and
   an engagement projection provided at one end of each armature mount plate, wherein
   an engagement groove is formed in the other end of the same to couple together the armature blocks.

6. A linear motor comprising:
   an armature of the linear motor defined in claim 1, and
   a magnetic field disposed so as to oppose the armature by way of a gap, wherein
   the magnetic field is generated by a yoke having a plurality of permanent magnets disposed therein such that different polarities are arranged alternately, and
   either the armature or the magnetic field is taken as a movable element which moves, and the other is taken as a stator.

* * * * *